July 30, 1929.   F. C. MONTUORI   1,722,334
BACKING FOR INTERCHANGEABLE TEETH
Filed Feb. 15, 1927
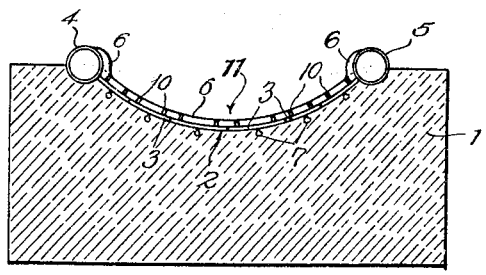
Fig. 1.
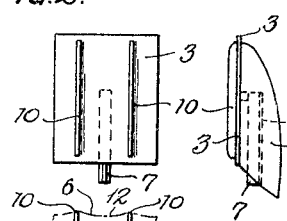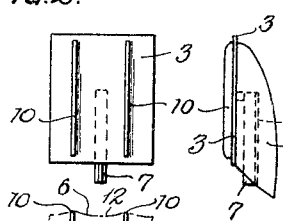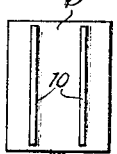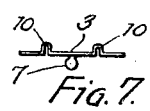
Fig. 2.   Fig. 3.   Fig. 7.
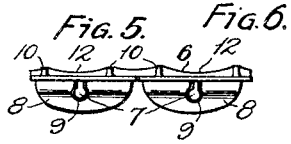
Fig. 4.   Fig. 5.   Fig. 6.
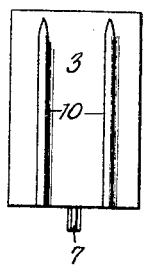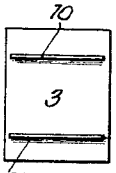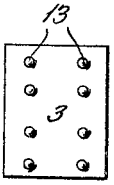
Fig. 8.   Fig. 10.   Fig. 11.   Fig. 12.   Fig. 13.
Fig. 9.
INVENTOR.
Felix C. Montuori
BY
Low & Lou
ATTORNEYS.

Patented July 30, 1929.

1,722,334

UNITED STATES PATENT OFFICE.

FELIX C. MONTUORI, OF WASHINGTON, DISTRICT OF COLUMBIA.

BACKING FOR INTERCHANGEABLE TEETH.

Application filed February 15, 1927. Serial No. 168,433.

The invention relates to artificial teeth, and has particular relation to backings for artificial teeth which are utilized in a dental office or laboratory in completing a finished plate, bridgework or dental appliance from the usual impression which is taken of the mouth of the patient preparatory to having the missing or required tooth or teeth built up.

In the character of bridgework with which the present improvements are used, for example anterior bridgework, the usual procedure, after the plaster impression is taken of the patient's mouth, is to prepare from the plaster impression a model of plaster or other compound. This model ordinarily carries abutments or crowns to which the work is fastened or soldered and incident to this work the backing plates are permanently united by gold solder or other dental alloy. Each backing plate, the number of which corresponds to the number of teeth necessary in the completed work, carries a web or tongue which is designed to register with a corresponding groove in the artificial tooth which is removably applied to the plate and cemented thereto by the tongue and groove connection as a final step in the completion of the bridgework. In the operation of soldering these plates or backings together, these artificial teeth may or may not be present and the plates are arranged side by side in a suitable body of plaster or refractory compound to maintain them in their proper relation and alignment. It will be understood that this compound has hardened and the plates or backings are embedded therein secure against displacement and the opposite ends of these plates are adjacent the abutments or crowns to which the same are designed to be soldered. Intermediate abutments or crowns may of course be present between the aligned plates or backings depending upon the nature of a particular bridgework under construction. It will be further understood that these abutments or crowns are usually constituted of cylindrical sleeves of gold or other suitable material which when completed are designed to be slipped over or around the anchor teeth in the patient's mouth. In anterior bridgework these teeth may be bicuspids located on either side of the patient's mouth next removed from the cuspids or eye teeth. The abutments or crowns to which the ends of the backing plates are soldered, in the instance described, are slipped over the two bicuspid teeth of the patient, it being assumed at this time that the artificial teeth have been cemented or otherwise secured by the described tongue and groove connections to the plates, and further that the plates have been securely soldered together with a continuous solder layer of the proper thickness.

With the backing plates embedded in the plaster compound and extending from between the abutments as previously described, it will be understood that these plates or backing members are in the form of an arc corresponding to the usual curved contour of the human jaw. The faces of the plate to which the teeth are to be applied are embedded in the plaster preparatory to the soldering operation. In the usual manner of soldering bridgework of this character, the body of plaster or refractory compound is placed on a laboratory bench or stove, and the backs of the plates, which are usually smooth, are facing upward. The aligned plates in the plaster compound constitute a concave surface and generally conform to the curved ridge of the human mouth. The operation of soldering the plates together is performed by the aid of a blowpipe and an approved solder of gold alloy may be employed. This soldering operation requires a relatively high temperature and causes the gold solder to melt and flow properly. The problem of obtaining a uniform solder layer over the plates to permanently unite the same by means of the solder is a delicate procedure and must be carried out with care and precision. The operation requires a considerable degree of skill to produce a product of high quality which may be comfortably worn by the patient, and must therefore be of substantial uniform thickness and conform to the curvature of the human mouth.

The present invention is designed to greatly simplify and improve present methods of uniformly soldering the backing plates together in the manner above described with the use of the usual blowpipe and gold solder alloy of high melting temperature.

One of the chief disadvantages heretofore attendant upon the soldering operation has been the fact that the gold alloy when melted by the blowpipe tends to collect in the more or less concave depression at or near the center of the aligned backing plates, thereby resulting in a superfluous amount of solder at this point and an insufficient amount of solder along the backing plates at or adjacent the ends of the work. The problem of preventing the solder from collecting by gravity before it has had time to solidify equally along all portions of the aligned backings or plates, has heretofore required a considerable amount of skill on the part of the operator and the completed work in a large number of instances is not characterized by an even distribution of hardened solder of uniform and proper thickness.

A further disadvantage attendant upon the soldering operation has been that, due to the high temperature at which the solder melts and the efforts of the operator in applying the same equally along the backing plates, it is very difficult to insure that a layer of gold solder of proper thickness is being deposited. This is for the reason that the backing plates as before described, have a comparatively smooth surface presented to the solder. When the latter is applied there is no means present on or adjacent the plates to definitely determine just how thick the solder layer is being applied, and it is difficult for the operator to determine whether the layer is too thick or too thin or whether it is uniform in thickness throughout.

Both of the above disadvantages have been entirely obviated by the present improvements. The present invention resides in the provision of an improved backing plate having formed integrally therewith or suitably applied thereto one or more webs, ridges, tongues, fins, projections or corrugations, which are located on the heretofore smooth lingual side of the backing plate and on the side opposite to the usual tongue for attaching the false or artificial teeth. The provision of these corrugations on the plates or backing members serves to effectually prevent the collection of the solder by gravity in the center of or at the lowest points of the work, as well as providing an efficient gauge by which the required and proper thickness of the solder layer may be accurately determined. The present advantages, as well as other advantages incident to the improvements will be hereinafter apparent from the specification and claims appended.

With such objects in view, as well as other advantages which may be incident to the use of the improvements, the invention consists in the parts and combinations thereof hereinafter set forth and claimed, with the understanding that the several necessary elements constituting the same may be varied in proportions and arrangements without departing from the nature and scope of the invention.

In order to make the invention more clearly understood there are shown in the accompanying drawings means for carrying the same into practical effect, without limiting the improvements, in their useful applications, to the particular constructions which, for the purpose of explanation, have been made the subject of illustration. In the said drawings:—

Fig. 1 is a side view of a body of plaster or other refractory compound having the improved backing plates constituting the present invention embedded therein.

Fig. 2 is an enlarged view of one of the backing members or plates illustrated in Fig. 1 and showing the webs or fins soldered or otherwise secured to one side of said backing.

Fig. 3 is a side view of the same showing the interchangeable tooth appled thereto on one side thereof.

Fig. 4 is a plan view of the same.

Fig. 5 is a view similar to Fig. 4 showing two of the aligned backings joined together by gold solder.

Fig. 6 is a view similar to Fig. 2 showing the webs or fins pressed integrally from the plate.

Fig. 7 is an end view thereof.

Fig. 8 is a view similar to Fig. 6 showing a backing or plate embodying a modified form of the webs or fins.

Fig. 9 is an end view thereof.

Figs. 10, 11, 12 and 13 illustrate further modifications of the plate or backing member.

Referring to the drawings, 1 indicates the body of plaster or other refractory compound, having its upper surface 2 of somewhat arcuate form to correspond with the shape of the human mouth. The dental bridgework temporarily embodied in the plaster consists of one or more backings or plates 3 preferably of gold or other appropriate base metal, and embodying the improvements contemplated in the present invention. The plates 3 as illustrated are placed side by side and pressed against or embedded in the plaster to insure the plates against displacement prior to the soldering operation. The abutments or crowns are illustrated at 4 and 5 and constitute preferably cylindrical or tubular portions of gold or suitable base metal, which abutments are intended to be slipped over to enclose the proper anchor teeth in the mouth of the patient and between which the completed bridgework including the soldered aligned plates, is designed to extend.

The crowns or abutments 4 and 5 are intended to be permanently united to the plates or backings 3 by means of gold solder 6 or other approved solder as illustrated in Fig. 1, and the plates 3 are designed to be similarly permanently united by the solder as will also be apparent from an inspection of said figures. The usual tongue 7 for engaging the artificial tooth, in the embodiment illustrated, is shown embedded in the plaster compound 1 and assists in anchoring and maintaining the plates 3 in proper relative alignment against the plaster base prior to the operation of soldering. The usual artificial tooth is indicated at 8 and has a suitable groove 9 by which the same engages the tongue 7 and is cemented thereto after the soldering operation has been completed and the plaster base 1 broken away.

Each plate or backing member is provided on its reverse or exposed side with one or more upstanding ribs, webs or corrugations 10 constituting projecting ridges which may be formed integrally with the plate member, or suitably secured or soldered thereto by any appropriate methods. Preferably these ridges or corrugations 10 extend in a vertical direction or longitudinally of the plate as illustrated, and substantially parallel to the major axis of each plate member. The purpose of these webs or corrugations 10 is to prevent the solder from flowing by gravity in objectionable amounts toward the central depression 11 (Fig. 1) of the bridgework during the soldering operation. These projections serve to encounter and hold portions of molten solder with which they come in contact. The presence of the solder against these ridges assists in maintaining thereagainst further molten solder as the same is applied from the solder supply and thereby materially aiding the operator to uniformly apply the solder to the exposed sides of the backing members. The presence of these ridges further prevents undue gravital flow of the solder away from soldered places. The intermediate position and distribution of the fins act to prevent shrinkage of the soldered pieces, heretofore considered a serious disadvantage and difficult to prevent in the construction of bridgework and dental structures of this character.

It will be further apparent from the structure as illustrated that the provision of these ridges or corrugations 10 on the exposed surfaces of the backing members 3 serves as an efficient gauge or guide to properly determine the thickness of the solder layer. The ridges are preferably of a depth corresponding to the desired thickness of the solder so that in order to insure the even distribution of the latter of the required thickness, the operator is only required to apply the solder until the tops of the ridges have been reached. At this time the operator is accurately informed that the solder has been applied to the desired uniform thickness which is the same throughout the extent of the aligned backing members and the completed work, after the solder has solidified, is of sufficient strength to withstand the ordinary usage in the mouth of the patient. Said ridges are also useful in case gold is cast on the backs of the backing members, insuring the integral union of said cast metal and backing members.

It will be further apparent that the provision of the ridges 10 on the backing plates results in the solder flow being drawn somewhat by natural flow between each ridge thereby leaving slight depressions 12 between each ridge, and these alternate spaced depressions in the finished work correspond to a marked degree to the natural form of the lingual surface of the patient's teeth. This results in giving the lingual or concave surface of the backings a natural contour desirable in work of this character. This result described is best illustrated in Figs. 4 and 5.

When the solder has been uniformly applied and solidified in the manner described it will be apparent that the backing members or plates 3 are securely and permanently united by the solder, which latter furthermore securely unites the abutments or crowns 4 and 5 to the outermost plates 3. The plaster backing or compound 1 is then broken away and the individual artificial teeth are applied and cemented to the tongues or projections 7. The completed work is then ready to be inserted in the mouth of the patient with the crowns or abutments 4 and 5 engaging or slipping over anchor teeth in the mouth of the patient.

From the foregoing it will be apparent that the improved backing plate constituting the present invention enables the solder to be applied uniformly without pooling or puddling along any portion of the aligned plate or plates, as well as being equally applied with a uniform and desired thickness, as well as naturally providing a completed surface having the proper lingual contour. All of these improvements are obtained and effected by the provision of the ribs or webs 10 formed integrally with or otherwise soldered or secured to one side of the backing members or plates 3.

While these projections 10 have been illustrated as two in number on each plate and described as preferably vertical and extending substantially parallel to the major axis of the substantially rectangular plate, it will be understood that the invention is not limited to any particular number of these projections, and the same may extend at an angle to or transversely of the plates if desired. The projections may further be constituted of independent or isolated protuberances 13 (Fig. 13) instead of continuous webs, as long as they serve to encounter and engage the molten solder and determine its thickness in the manner described above with reference to the illustrated embodiment of the invention. Some of the modifications contemplated by the present improvements are shown for example in Figs. 10 to 13 inclusive. The invention contemplates further the use of these projections as of curved or sinuous configuration without departing from the nature and scope of the invention as hereinafter claimed.

It will be further understood that, after the soldering operation and the removal of the plaster compound base, the edges of the plates 3 are filed away to conform to the configuration of the tooth cemented thereto. The plates or backings 3 are manufactured and distributed in various sizes corresponding to the usual sizes of particular teeth to be secured thereto. In this manner in finishing the bridgework, the amount and extent of filing necessary is reduced to a minimum.

The invention will simplify the soldering process of the bridge and economizes in the use of solder.

The metal which unites the backing plates, instead of being applied gradually, may be poured into a mold containing the backings, and the molten metal unites securely with the ridges 10.

What is claimed is:—

1. A backing member for dental bridge work, having adjacent each of opposite edges of its side to which solder is to be applied a projection equal in height to the desired thickness of solder, said projections serving as a gage to determine the thickness of solder along the line between themselves.

2. A backing for interchangeable teeth having a tongue for removably engaging an artificial tooth and having on its opposite face spaced webs for engaging the solder to gauge the uniform application of the latter to the finished work.

3. A backing for interchangeable teeth having a tongue for removably engaging an artificial tooth and having on its opposite face a plurality of upstanding portions extending substantially the length of the backing for engaging the solder for uniting the backings and preventing undue gravital flow of the solder.

4. A backing for interchangeable teeth having a tongue for removably engaging an artificial tooth and having on its opposite face a plurality of longitudinal upstanding portions for engaging the solder for uniting the backings and preventing shrinkage of the plate.

5. A backing for an artificial tooth adapted at one side of itself to receive such a tooth and having at its other side projecting means by which the depth of solder applied to said side can be determined for the length of the backing.

6. A backing for an artificial tooth adapted at one side of itself to receive such a tooth and having at its other side a projecting obstruction disposed longitudinally of the tooth and extending substantially the length of the backing for restricting gravital flow of solder applied to said side.

7. A backing for an artificial tooth adapted at one side of itself to receive such a tooth and having at its other side an independent projecting solid rib disposed longitudinally of the tooth for preventing gravital flow of solder and to prevent shrinkage of the backing with respect to the tooth.

8. A backing for an artificial tooth adapted at one side of itself to receive such a tooth and having at its other side a plurality of projecting ribs for showing the depth of solder applied to said side.

9. A backing for an artificial tooth adapted at one side of itself to receive such a tooth and having at its other side a plurality of projecting ribs for limiting the flow of solder applied to said side.

10. A backing plate for dental bridge work, having means for attaching a tooth to the front of the plate and having at the back of the plate means independent of such tooth-attaching means for gauging over the entire backing the thickness of solder to be applied thereto.

11. A backing plate for dental bridge work, having tooth-attaching means projecting only at the front of said plate and having at the back of the plate a projection for gauging over the entire backing the thickness of solder to be applied thereto.

12. A denture comprising a series of artificial tooth backings having longitudinal projections extending substantially the length of the backings and of a height equal to any desired thickness of solder and solder applied to said backings flush with the tops of said projections.

13. A denture comprising a series of artificial tooth backings having longitudinal projections extending substantially the length of the backings and of a height equal to any desired thickness of solder and solder applied to said backings flush with the tops of said projections and hollowed between them.

In testimony whereof I affix my signature.

FELIX C. MONTUORI.